United States Patent [19]

McMillan

[11] Patent Number: 4,522,325
[45] Date of Patent: Jun. 11, 1985

[54] DEVICE FOR RAISING AND LOWERING A SPARE TIRE

[76] Inventor: Donnell W. McMillan, 7949 Cranberry Cir., Cupertino, Calif. 95014

[21] Appl. No.: 544,513

[22] Filed: Oct. 24, 1983

[51] Int. Cl.³ .............................................. B65D 43/04
[52] U.S. Cl. .............................. 224/42.21; 224/42.23; 414/463
[58] Field of Search ......................... 224/42.21, 42.23; 414/463

[56] References Cited

U.S. PATENT DOCUMENTS

| | | | |
|---|---|---|---|
| 3,390,864 | 7/1968 | Searcy et al. | 414/463 X |
| 4,047,629 | 9/1977 | Klein | 224/42.21 X |
| 4,329,107 | 5/1982 | Smith | 224/42.23 X |
| 4,377,366 | 3/1983 | Hamlyn | 224/42.23 X |

Primary Examiner—Steven M. Pollard
Attorney, Agent, or Firm—Paul L. Hickman

[57] ABSTRACT

A device for raising and lowering a pickup truck's spare tire characterized by an actuating lever pivotally attached to the truck's rear bumper, and a cable coupling the actuating lever to the truck's spare tire cross strap. The cable is trained over a pair of pulleys so that when the actuating lever is pivoted away from the bumper the spare tire cross strap member pivots to the ground to permit the removal of the spare tire. When the actuating lever is pivoted towards the bumper, the cross strap member pivots back into a horizontal position to raise the spare tire back to its stored position. A locking mechanism is provided so that the actuating lever can be locked to the bumper.

9 Claims, 5 Drawing Figures

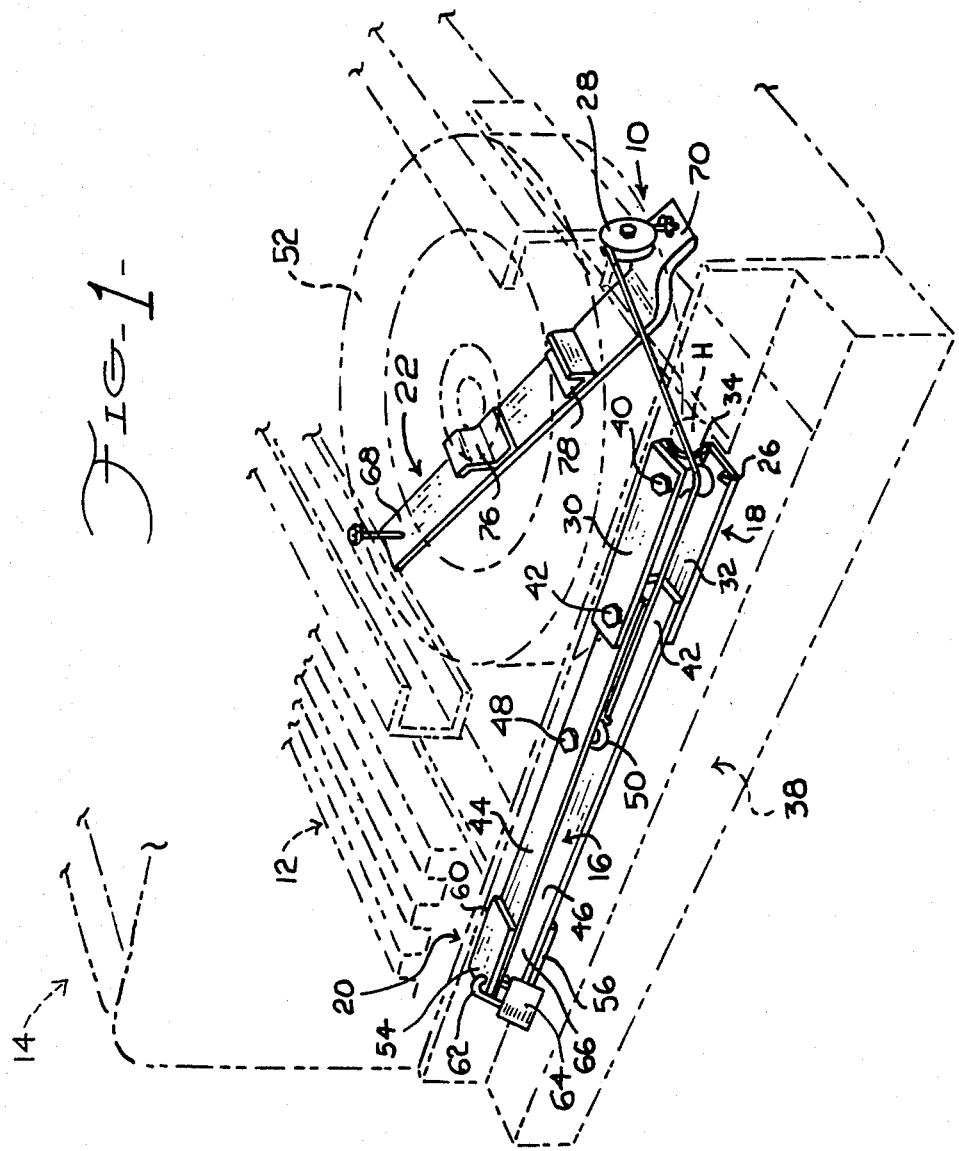

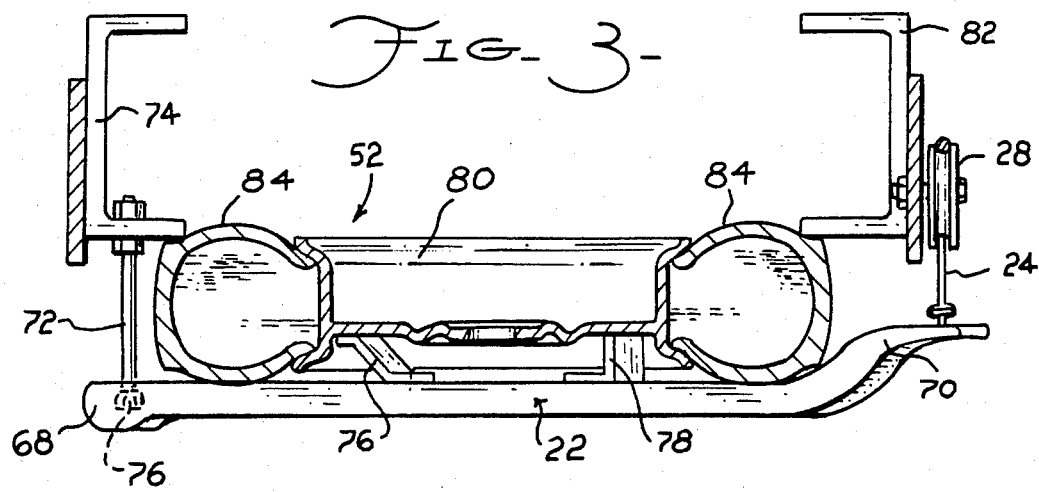
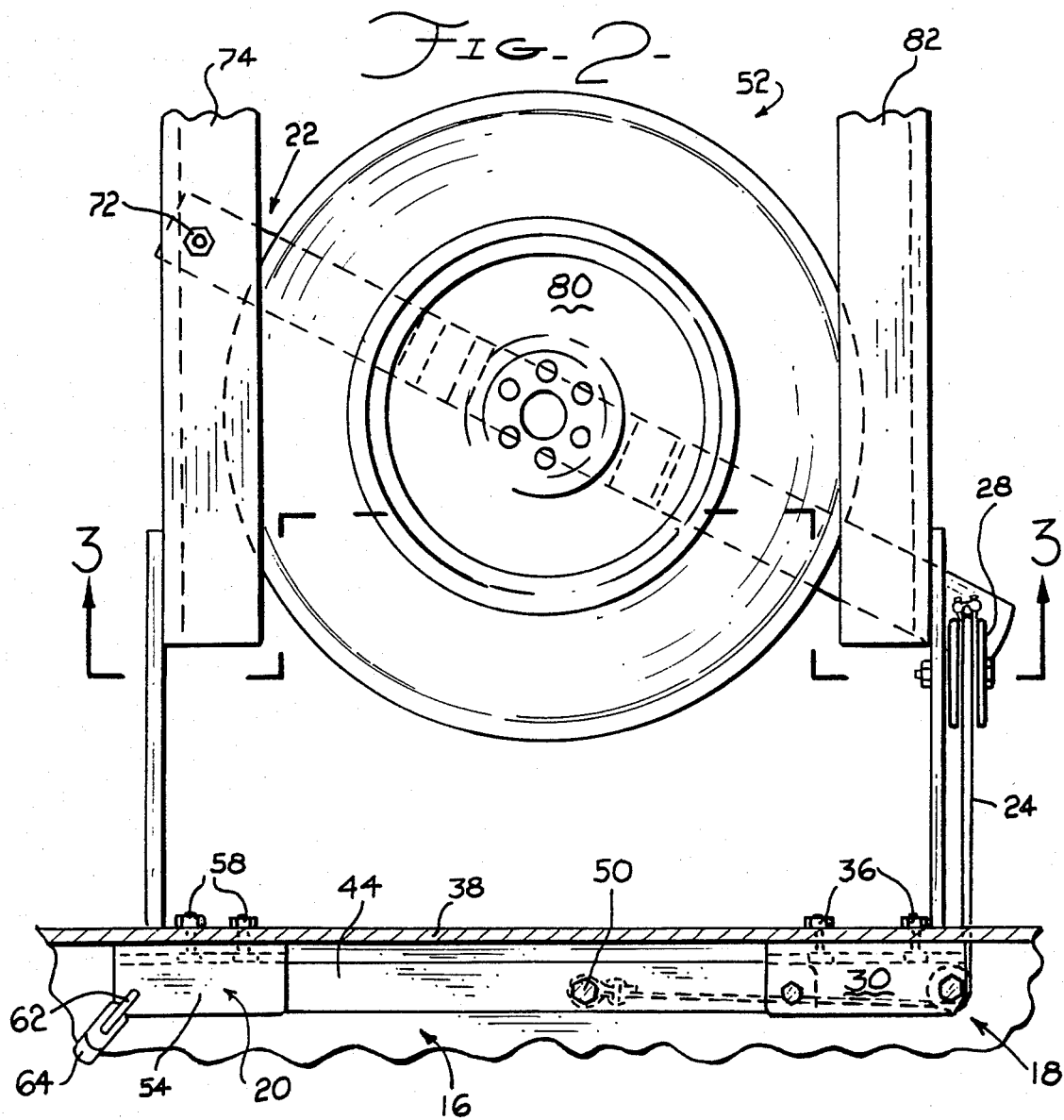

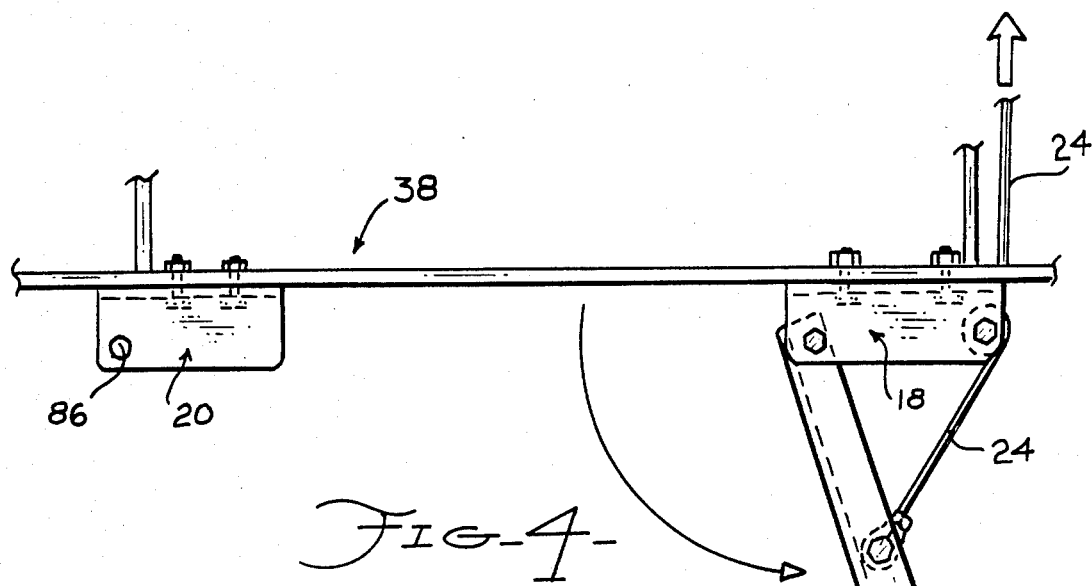
FIG-4-
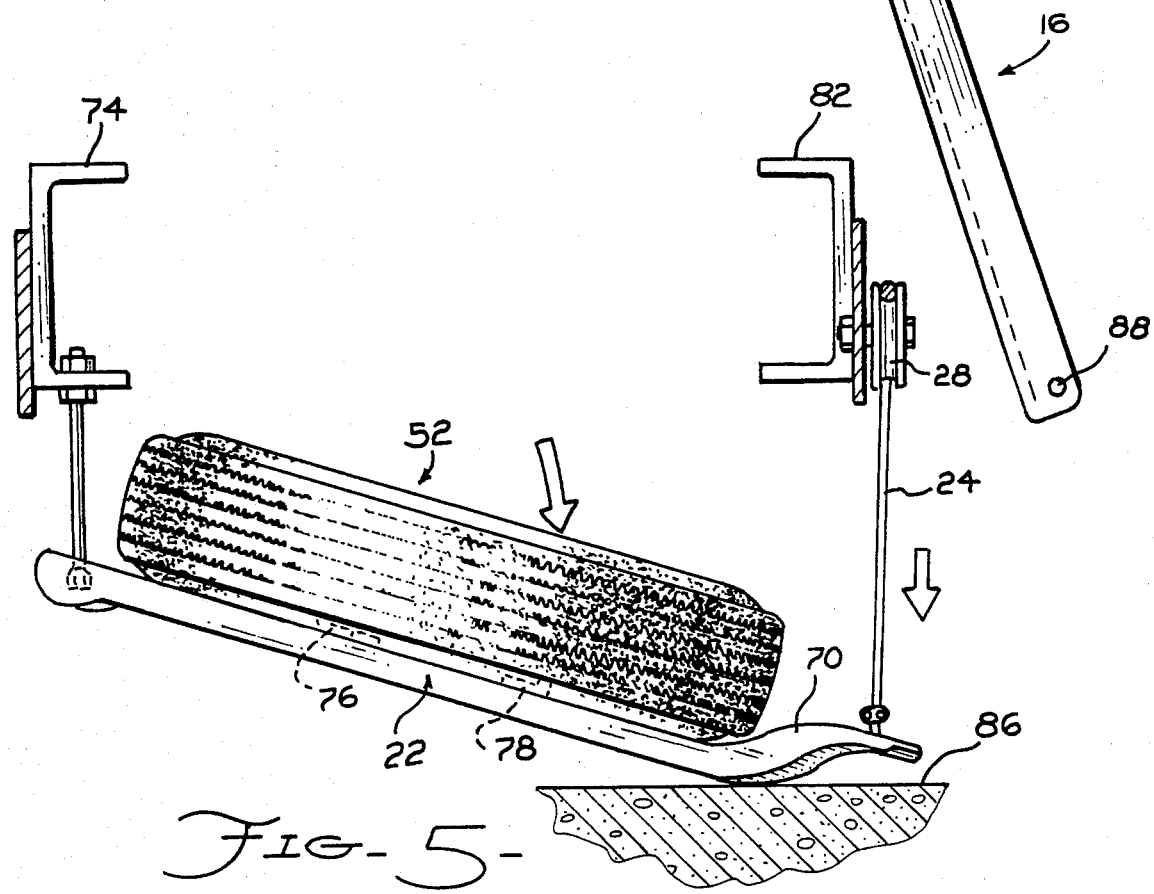
FIG-5-

DEVICE FOR RAISING AND LOWERING A SPARE TIRE

BACKGROUND OF THE INVENTION

1. Field of the Invention

This invention relates generally to automotive accessories and more particularly to devices which raise and lower a spare tire from beneath the bed of a pickup truck.

2. Description of the Prior Art

The spare tire for a pickup truck is typically mounted beneath the pickup truck's bed and near the rear axle. While some imported pickup trucks include a winch type lowering mechanism for raising and lowering the spare tire, most American pickup trucks have their spare tire held in position with a cross strap bolted to their frame.

Because of this arrangement, it is difficult and inconvenient to remove and replace a spare tire from most American pickup trucks. For example, to remove the pickup truck's spare tire, a wing nut which holds one end of the cross strap is loosened with one hand, while the other hand must hold the cross strap to prevent the spare tire from crashing down after the wing nut is removed. To replace the spare tire, the entire weight of the spare tire and the cross strap assembly must be held with one hand while the wing nut is replaced on the mounting bolt with the other hand.

A number of prior art patents have addressed this problem. For example, U.S. Pat. No. 4,329,107 of Smith discloses a spare tire carrier including a lever arm pivotally attached to a pickup truck's rear bumper, a pair of pulleys attached to the pickup truck's frame, and a cable attached to the lever and trained over the pulleys. The free end of the cable is attached to a member which engages the hub of the spare tire's wheel. A similar device is taught in U.S. Pat. No. 3,390,864 of Searcy.

A different approach to lowering a pickup truck's spare tire is described in U.S. Pat. No. 4,060,171 of Ludwig and British Pat. No. 1,120,909 of Simca. Both Ludwig and Simca teach a spare tire carrier including a pivotal support brace, and a plurality of linkage members coupling a free end of the support brace to the pickup truck's frame. Lowering mechanisms are provided to extend the length of the linkages and thus lower the pivotal support brace to allow the removal of the spare tire.

A problem with prior art spare tire lowering mechanisms is that they are relatively complex and are difficult to install. Furthermore, the prior art devices require that the existing spare tire cross strap be removed in order to install the new mechanism. Because of these problems, the tire lowering devices of the prior art have not been widely adopted.

SUMMARY OF THE INVENTION

An object of this invention is to provide a device for raising and lowering a pickup truck's spare tire which is economical, sturdy, and easy to install.

Another object of this invention is to provide a spare tire raising and lowering device which utilizes a pickup truck's existing spare tire cross strap as part of its assembly.

Yet another object of this invention is to provide a device which makes it more difficult for a thief to steal a pickup truck's spare tire.

Briefly, the invention comprises a spare tire cross strap pivotally attached to the frame of the pickup truck beneath its bed, an actuating lever pivotally attached at one end to the pickup truck's rear bumper, a flexible cable coupling the actuating lever to the free end of the cross strap, and a locking assembly for locking the actuating lever to the pickup truck's bumper.

An advantage of this invention is that it is extremely easy to retrofit the device to most pickup trucks.

Another advantage to this invention is that the existing spare tire cross strap is utilized to support the spare tire, resulting is a lower cost to produce the device of the present invention and further resulting in making the device easier to install.

A still further advantage of this invention is that the actuating lever can be locked to the pickup truck's bumper to prevent theft of the spare tire.

These and other objects and advantages of the present invention will no doubt become apparent upon a reading of the following descriptions and a study of the several figures of the drawing.

BRIEF DESCRIPTION OF THE DRAWING

FIG. 1 shows a perspective of the present invention in solid lines and shows the environment of the invention in broken lines.

FIG. 2 is a top plan view of the present invention as seen from beneath the bed of a pickup truck.

FIG. 3 is a cross-sectional view taken along line 3—3 of FIG. 2.

FIG. 4 is a top plan view of the actuating lever mechanism of the present invention.

FIG. 5 is an elevational view of the cross-strap and cable mechanism of the present invention.

DETAILED DESCRIPTION OF THE PREFERRED EMBODIMENT(S)

Referring to FIG. 1, a device 10 for raising and lowering a spare tire from beneath the bed 12 of a pickup truck 14 includes an actuating lever 16, a pivot base 18, a retaining member 20, a spare tire cross strap 22, and a flexible cable 24. Cable 24 is coupled at one end to actuating lever 16, is attached at its other end to cross strap member 22, and is trained over a first pulley 26, through a hole H provided in the truck's bumper, and over a second pulley 28.

Referring additionally of FIG. 2, pivot base 18 is a short segment of channel member having a top wall 30, a bottom wall 32, and a back wall 34. A pair of nuts and bolts 36 extend through back wall 34 to attach pivot base 18 to a bumper 38 of pickup truck 14. A bolt extends between walls 30 and 32 to serve as an axle for pulley wheel 26. A bolt 42 extends between top wall 30 and bottom wall 32 of pivot base 18 to pivotally attach an end 42 of actuating lever 16 to pivot base 18.

Actuating lever 16 is a channel shaped member having a top wall 44 and a bottom wall 46. A bolt 48 extends between top wall 44 and bottom wall 46 to hold an end 50 of cable 24. Actuating lever 16 is made to be long enough to provide sufficient leverage to easily raise and lower a spare tire 52.

Retaining member 20 is also a channel shaped member having a top wall 54 and a bottom wall 56. A pair of nuts and bolts 58 attach a back wall 60 of the retaining member to bumper 38.

Top wall 54 of retaining member 20 and top wall 44 of actuating lever 16 are provided with matching apertures which allows the shackle 62 of a padlock 64 to lock an end 66 of actuating lever 16 to retainer member 20. When the padlock is in place, actuating lever 16 cannot be pivoted away from bumper 38 to lower cross strap 22.

Referring now additionally to FIG. 3, cross strap member 22 is an elongated member having a flat end 68 and an upwardly curved end 70. An elongated bolt 72 is attached at its upper end to a frame member 74 of pickup truck 14 and has a head 76 engaged with a slightly smaller aperture provided in end 68 of cross strap 22. A pair of flanges 76 and 78 engage the wheel portion 80 of spare tire 52.

Pulley 28 is attached to another frame member 82 such that cable 24 can be attached to end 70 of cross strap 22. When cross strap 22 is in its raised, horizontal position as shown in FIG. 3, the tire portion 84 of spare tire 52 is held firmly in position between frame members 74/82 and cross strap member 22. Flanges 76/78 prevent spare tire 52 from moving laterally.

Cable 24 is preferably made from a high tensile strength material such as aircraft cable. The chance of such cable failing under normal operating conditions is extremely remote.

With reference to FIGS. 4 and 5, the actuating lever 16 can be pivoted away from bumper 38 as indicated at 84. As the actuating lever 16 pivots cable 24 allows end 70 of cross strap 22 to lower to the ground 86. From this position the spare tire 52 can be easily removed.

When the spare tire is to be replaced, it is placed over flanges 76 and 78 and actuating lever 16 is pivoted back to bumper 38. The shackle 62 of padlock 64 is then engaged with aperture 86 of retaining member 20 and aperture 88 of actuating member 16 to lock the actuating member firmly to bumper 38.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A device for raising and lowering a spare tire from beneath a pickup truck's bed comprising:
    (a) an elongated spare tire cross strap having a first end pivotally attached to said truck beneath said bed;
    (b) a pivot base attached to said truck;
    (c) a retaining member spaced from said pivot base and attached to said truck;
    (d) an actuating lever having a first end attached to said pivot base by a pivot, and a second end engagable with said retaining member;
    (e) a first pulley having a substantially vertical axis of rotation attached to said pivot base proximate said pivot of said actuating lever;
    (f) a second pulley having a substantially horizontal axis of rotation attached to said truck beneath said bed; and
    (g) a cable trained over the two pulleys having a first end attached to said actuating lever proximate said first end thereof, and having a second end attached to a second end of said cross strap;
    whereby moving said second end of said actuating lever towards said retaining member raises said second end of said cross strap, and moving said second end of said actuating lever away from said retaining member lowers said second end of said cross strap.

2. A device as recited in claim 1 further comprising means for removably attaching said actuating lever to said retaining member when said second end of said actuating lever is engaged with said retaining member.

3. A device as recited in claim 1 wherein said actuating lever, said retaining member, and said pivot base are channel shaped members.

4. A device as recited in claim 3 wherein said first end of said actuating lever is retained within wall portions of said pivot base, and wherein said second end of said actuating lever fits within wall portions of said retaining member when they are engaged.

5. A device as recited in claim 1 wherein said first end of said cross strap is pivotally supported by the lower end of an elongated, vertical support post.

6. A retrofit device for raising and lowering the free end of a pivoting spare tire cross strap that is attached beneath the bed of a pickup truck comprising:
    (a) a pivot base attached to said truck;
    (b) a retaining member spaced from said pivot base and attached to said truck;
    (c) a actuating lever having a first end attached to said pivot base by a pivot, and a second end engagable with said retaining member;
    (d) a first pulley having a substantially vertical axis of rotation attached to said pivot base proximate said pivot of said actuating lever;
    (e) a second pulley having a substantially horizontal axis of rotation attached to said truck beneath said bed; and
    (f) a cable retained over the two pulleys having a first end attached to said actuating lever proximate said first end thereof, and having a second end attached to said free end of said cross strap;
    whereby moving said second end of said actuating lever towards said retaining member raises said cross strap, and moving said second end of said actuating lever away from said retaining member lowers said cross strap.

7. A retrofit device as recited in claim 6 further including lock means for locking said second end of said actuating lever to said retaining member.

8. A retrofit device as recited in claim 6 wherein said retaining member and said pivot base are channel members, and wherein said actuating lever is adapted to move within said channel members.

9. A retrofit device as recited in claim 8 wherein said actuating lever is a channel member, and wherein said cable means is attached within the walls of said actuating lever.

* * * * *